2 Sheets—Sheet 1.
R. STRAWSER.
Bee-Hives.
No. 199,328. Patented Jan. 15, 1878.
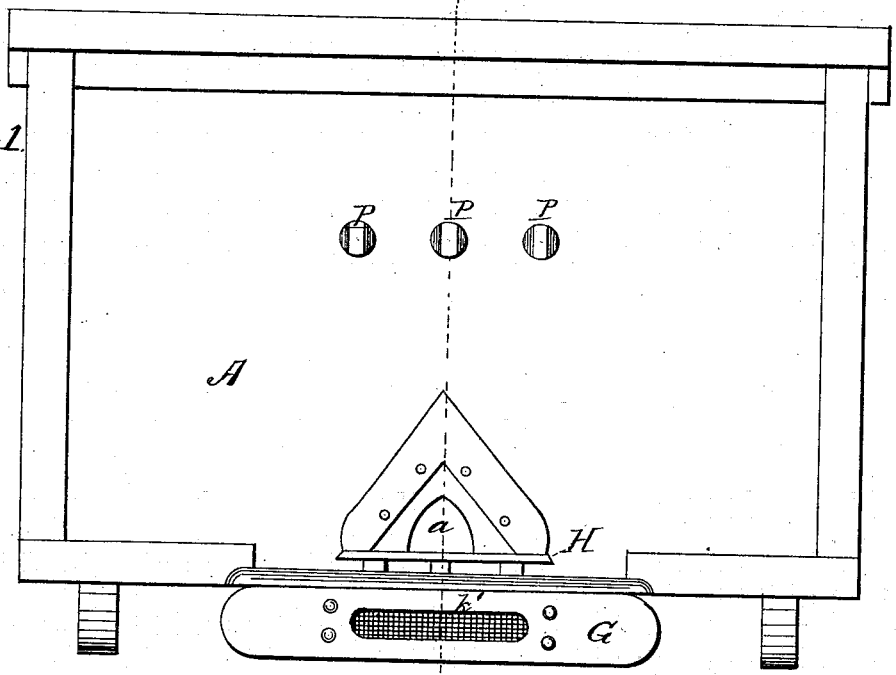
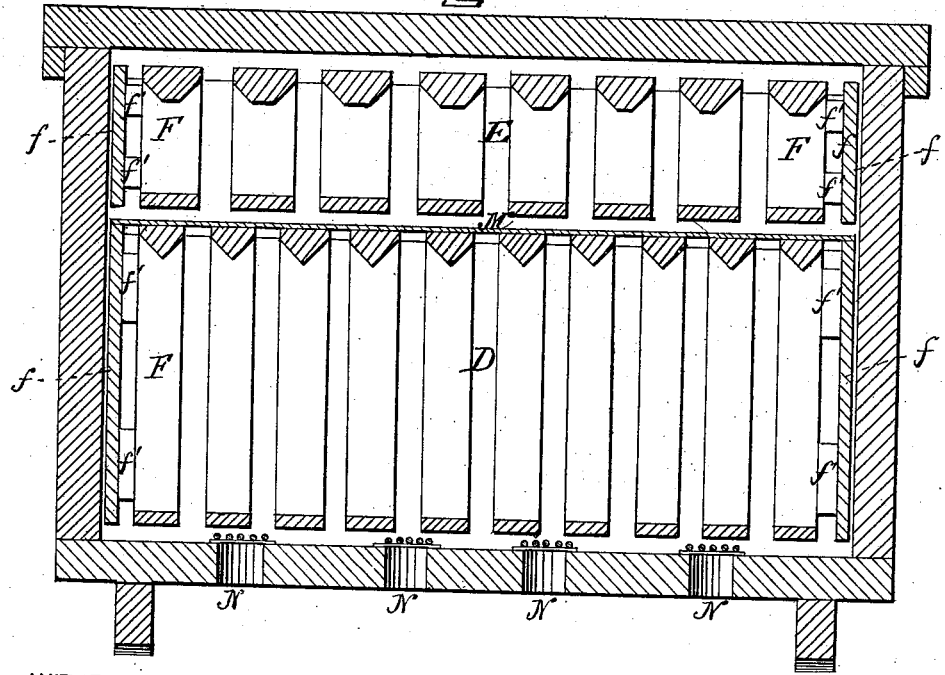
WITNESSES
F. J. Masi
W. C. Masi
INVENTOR
Reubin Strawser,
by E. W. Anderson,
ATTORNEY
N. PETERS, PHOTO-LITHOGRAPHER, WASHINGTON, D.C.

2 Sheets—Sheet 2.
R. STRAWSER.
Bee-Hives.
No. 199,328. Patented Jan. 15, 1878.
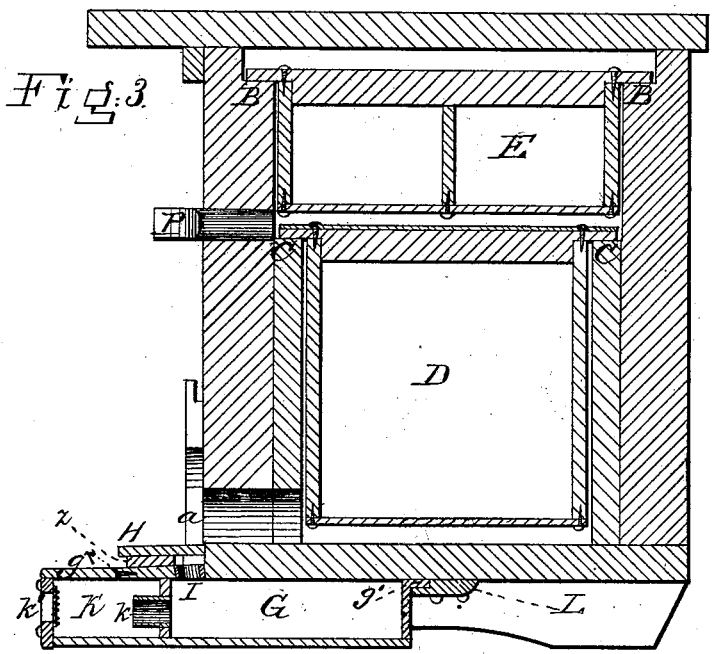
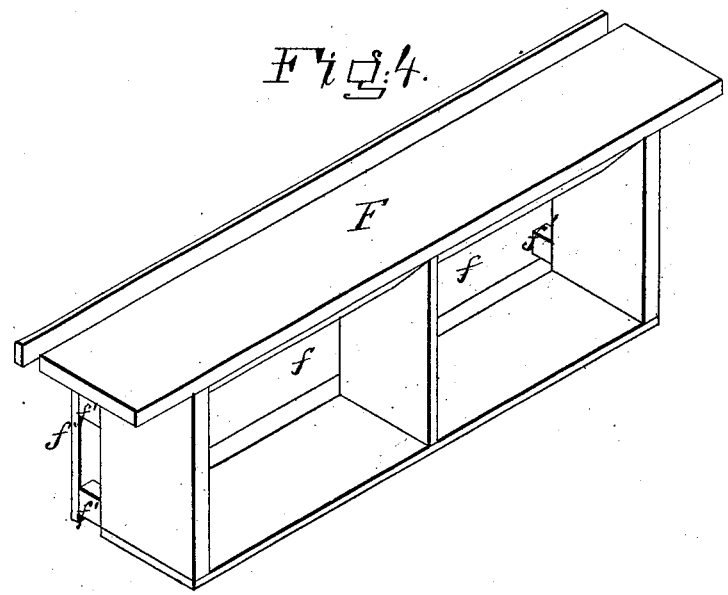
WITNESSES
INVENTOR
Robin Strawser,
by E.W. Anderson,
ATTORNEY

UNITED STATES PATENT OFFICE.

RUBIN STRAWSER, OF NEKODA, PENNSYLVANIA.

IMPROVEMENT IN BEE-HIVES.

Specification forming part of Letters Patent No. 199,328, dated January 15, 1878; application filed June 30, 1877.

*To all whom it may concern:*

Be it known that I, RUBIN STRAWSER, of Nekoda, in the county of Perry and State of Pennsylvania, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my invention. Fig. 2 is a longitudinal central section thereof. Fig. 3 is a central cross-section thereof, and Fig. 4 is a detail perspective view of a comb-frame.

My invention relates to improvements in the construction and arrangement of the several parts of a bee-hive, whereby its interior accommodations may be adapted to the size of the colony, the attachment of comb-frames to the hive-walls prevented, and provision made against the entry of millers and other insects into the hive.

The invention consists in constructing the end comb-frames with a back or side wall, separated from the frame by studs, as will be more fully shown and described in the claim.

A indicates the side walls of the hive; B and C, longitudinal shoulders running the whole length of the side walls. D is the lower row of comb-frames, and E the upper row. F, Fig. 4, is one of the end comb-frames, (indicated by the same letter in Fig. 2,) and $f$ is a back or side wall, separated from the frame by short studs $f'$, in order to leave a bee-passage. G is the miller-box, attached to the bottom of the hive, and $g$ is the platform upon which the millers light. H is the bee-perch, and $a$ the bee-entrance. The bee-perch H is supported above the platform $g$, leaving a space between said perch and platform. I is the opening by which the millers enter the box. K is a front chamber of the miller-box, into which the insects enter through passage $k$ from the rear chamber. The front of the miller-box is provided with an opening or window, $k'$, covered with wire netting. L is a cleat attached to the bottom of the hive, and upon this cleat rests another, $g'$, upon the rear end of the miller-box. The platform $g$ is divided into two longitudinal divisions, as indicated by the line $z$, and from the front part project pins $p$, which fit into holes in the rear part of said platform. P indicates plugs inserted in holes in the front side of the hive, on a level with the top of row of comb-frames D. M is a cloth covering the lower row of comb-frames, for the purpose of preventing injury to the bees by cold.

In the operation of my invention, the lower row of comb-frames D is arranged upon the shoulders C in the ordinary manner, the frames F being placed at the ends, with their backs against the end walls of the hive. Sufficient space is left between the comb-frames to allow the bees to pass between them, and the entire row is then covered with the cloth M, by which the natural heat of the bees is retained. In cold weather a heavier cloth should be used than in warm weather. When the lower row of frames is filled with comb the cloth should be removed and the upper row of frames placed in the hive upon shoulders B, the frames having backs being placed at the ends, as in the lower row, and the upper row should then be covered with the cloth. The top of the hive should, of course, be kept on, as usual, when the bees are left to work.

When the end comb-frame has no back, and is near the wall, the bees are apt to attach the comb to the wall, which renders it difficult to remove.

When there is only a small colony, only a few of the lower frames should be at first placed in the hive, and near the middle; but the frames with backs should be placed at the ends of the short row. When the short row is filled the frames should be moved apart and empty frames inserted between them, until in this way the whole row is filled. If there is a very large colony, both rows of frames may be placed in the hive at the same time.

As is well known, millers and other insects are continually seeking entrance to bee-hives, attracted by the honey, and, if permitted to enter, discommode the bees, and millers especially would deposit their eggs, which develop worms. In seeking an entrance the millers usually light upon the most prominent part near the bee-entrance, and I have provided for them the platform $g$, along which they crawl under the bee-perch and through the opening I into the box G, from the rear chamber of which they, many of them, fly toward the light from the window in the front chamber, through which window may be seen when the box needs emptying. The box may be detached for this purpose by drawing it toward the front, removing the pins p from the holes and the cleat on the box from cleat L.

When the lower row of frames is filled, I should have stated, the plugs P should be removed to allow the bees easy access to the upper row.

Having now described the construction and operation of my invention, I claim and desire to secure by Letters Patent—

In a bee-hive, the comb-frame F, having a back or side wall, f, separated from said frame by the studs f', substantially as and for the purpose specified.

In testimony that I claim the above I have hereunto subscribed my name in the presence of two witnesses.

RUBIN STRAWSER.

Witnesses:
KIRK HAINES,
C. HEISEY.